(12) United States Patent
Huang et al.

(10) Patent No.: US 11,709,419 B2
(45) Date of Patent: Jul. 25, 2023

(54) DISPLAY UNIT INCLUDING DISPLAY PANELS, WAVELENGTH CONVERSION ELEMENT, AND LIGHT COMBINING ELEMENT AND PROJECTION DEVICE

(71) Applicant: Coretronic Corporation, Hsin-Chu (TW)

(72) Inventors: Yu-An Huang, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/498,749

(22) Filed: Oct. 12, 2021

(65) Prior Publication Data

US 2022/0113618 A1 Apr. 14, 2022

Related U.S. Application Data

(60) Provisional application No. 63/091,317, filed on Oct. 14, 2020.

(30) Foreign Application Priority Data

Nov. 13, 2020 (CN) .......................... 202011268291.4

(51) Int. Cl.
*G03B 33/12* (2006.01)
*G02B 27/10* (2006.01)
*G03B 21/20* (2006.01)

(52) U.S. Cl.
CPC ........... *G03B 33/12* (2013.01); *G02B 27/102* (2013.01); *G03B 21/204* (2013.01)

(58) Field of Classification Search
CPC .. G03B 33/12; G03B 21/204; G03B 21/2066; G03B 21/2013; G03B 21/10;
(Continued)

(56) References Cited

U.S. PATENT DOCUMENTS

2017/0069612 A1* 3/2017 Zhang ................ G03B 21/2033
2018/0180976 A1* 6/2018 Inoko ..................... G03B 21/28
(Continued)

FOREIGN PATENT DOCUMENTS

CN 108255004 7/2018
CN 110632814 12/2019
(Continued)

OTHER PUBLICATIONS

"Search Report of Europe Counterpart Application", dated Mar. 16, 2022, p. 1-p. 6.
(Continued)

*Primary Examiner* — Magda Cruz
(74) *Attorney, Agent, or Firm* — JCIPRNET

(57) ABSTRACT

The disclosure provides a display unit and a projection device. The display unit includes a first display panel having first light emitting elements configured to provide a first color light, a wavelength conversion element located on a transmission path of the first color light and having a conversion region and a non-conversion region, a second display panel having second light emitting elements configured to provide a second color light, and a light combining element. A quantum dot conversion material is disposed on the conversion region. Part of the first color light is converted into a third color light after passing through the conversion region, and another part of the first color light passes through the non-conversion region. The light combining element is located on transmission paths of the first color light, the second color light and the third color light and is configured to form an image beam.

14 Claims, 4 Drawing Sheets

(58) Field of Classification Search
CPC .............. G03B 21/142; G03B 21/2033; G02B 27/102; H04N 9/3138; H04N 9/3158; H04N 9/3105; H04N 9/315
See application file for complete search history.

(56) References Cited

U.S. PATENT DOCUMENTS

| | | | |
|---|---|---|---|
| 2018/0307129 | A1 | 10/2018 | Shin et al. |
| 2019/0131350 | A1 | 5/2019 | Kwak et al. |
| 2019/0267357 | A1 | 8/2019 | Iguchi et al. |
| 2019/0331963 | A1* | 10/2019 | Kim .................. G02F 1/133514 |
| 2019/0331995 | A1 | 10/2019 | Chen et al. |
| 2020/0026173 | A1 | 1/2020 | Chen et al. |
| 2020/0083408 | A1* | 3/2020 | Sakata ............... G03B 21/2013 |
| 2020/0183264 | A1 | 6/2020 | Templier et al. |
| 2020/0287103 | A1 | 9/2020 | Maegawa et al. |

FOREIGN PATENT DOCUMENTS

| | | |
|---|---|---|
| CN | 110855968 | 2/2020 |
| CN | 111129269 | 5/2020 |
| CN | 210835436 | 6/2020 |
| EP | 3345051 | 7/2018 |
| EP | 3483933 | 5/2019 |
| JP | 2015228312 | 12/2015 |
| JP | 2020042133 | 3/2020 |
| TW | 201033961 | 9/2010 |
| TW | 201740358 | 11/2017 |

OTHER PUBLICATIONS

"Office Action of Taiwan Counterpart Application", dated Jun. 2, 2022, p. 1-p. 5.
"Search Report of Europe Related Application, Application No. 22153272.4", dated Jun. 23, 2022, p. 1-p. 18.
"Office Action of Taiwan Counterpart Application", dated Nov. 26, 2021, p. 1-p. 8.
"Office Action of China Counterpart Application", dated Oct. 26, 2022, pp. 1-7.

* cited by examiner

DISPLAY UNIT INCLUDING DISPLAY PANELS, WAVELENGTH CONVERSION ELEMENT, AND LIGHT COMBINING ELEMENT AND PROJECTION DEVICE

CROSS-REFERENCE TO RELATED APPLICATION

This application claims the priority benefits of U.S. provisional application Ser. No. 63/091,317, filed on Oct. 14, 2020 and China application serial no. 202011268291.4, filed on Nov. 13, 2020. The entirety of each of the above-mentioned patent applications is hereby incorporated by reference herein and made a part of specification.

BACKGROUND

Technical Field

The disclosure relates to an optical unit and an optical device, and more particularly to a display unit and a projection device provided with the display unit.

Description of Related Art

Generally speaking, a three-color-mixing projection device using digital light processing (DLP) and liquid crystal on silicone (LCoS) requires a solid-state light source such as light emitting diodes (LED) and laser diodes (LD) to provide illumination, and forms a projection beam in collaboration with an optical system design. However, the projection device formed in this way has a large size, which is not conducive to the manufacture of a small-size projection device.

There is an existing projection device formed by a display and a light combining system using multiple micro-LEDs as the light source, which has the advantage of small size. However, when the distance between micro-LEDs is less than 5 microns, a large number of micro-LED chips have to be transferred and bonded to the driving backboard, and in order to form a full-color panel, transfers of a large number of micro-LED chips have to be carried out for many times, and the processes are quite difficult. Therefore, currently, there is no one-piece full-color micro-LED display panel available on the market.

However, when a three-piece micro-LED display panel and an X prism light combining system are used to form a micro projection device, the beam provided by the micro-LEDs has a large light emitting angle, so the processing of light leakage of different colors of light and the alignment problem also becomes complicated. Even if a reflector or a micro lens array is used to reduce the light emitting angle of the beam provided by the micro-LEDs, when the distance between the micro-LEDs is less than 5 microns, the possible minimum of the light emitting half angle is about 20 degrees. Therefore, when light from different micro-LED display panels is combined, part of the beam is totally reflected in the X prism light combining system, which leads to the introduction of invalid light into the subsequent optical system and causes the generation of stray light, thus affecting the contrast of the image screen.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a display unit and a projection device, which have the advantages of small size and good image quality.

Other objects and advantages of the disclosure may be further understood from the technical features disclosed herein.

In order to achieve one or a part or all of the above or other objects, an embodiment of the disclosure provides a display unit. The display unit includes a first display panel, a wavelength conversion element, a second display panel, and a light combining element. The first display panel has multiple first light emitting elements which are configured to provide a first color light. The wavelength conversion element is located on a transmission path of the first color light and has a conversion region and a non-conversion region. A quantum dot conversion material is disposed on the conversion region. Part of the first color light is converted into a third color light after passing through the conversion region, and another part of the first color light passes through the non-conversion region. The second display panel has multiple second light emitting elements which are configured to provide a second color light. The light combining element is located on transmission paths of the first color light, the second color light and the third color light, and is configured to guide the third color light, the second color light and the first color light that passes through the non-conversion region to form an image beam.

In order to achieve one or a part or all of the above or other objects, an embodiment of the disclosure provides a projection device. The projection device includes the display unit and a projection lens. The projection lens is located on a transmission path of the image beam and is configured to project the image beam out of the projection device.

Based on the above, the embodiments of the disclosure have at least one of the following advantages or effects. In the embodiments of the disclosure, with the disposition of the first display panel and the second display panel of the display unit, it is not necessary to dispose an X prism light combining system, and it is possible to dispose only a single-piece beam splitter, which has advantages of a simple structure and small size, and may reduce the possibility of stray light due to introduction of invalid light into the subsequent optical system when the color light of different micro-LED display panels is totally reflected. Moreover, with the disposition of the first display panel and the second display panel of the display unit, the projection device has a simple structure, has the advantage of small size, may reduce the number of color lights that need to be aligned, and may also reduce the possibility of stray light in the system. In this way, the contrast and image quality of the image screen may be further enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
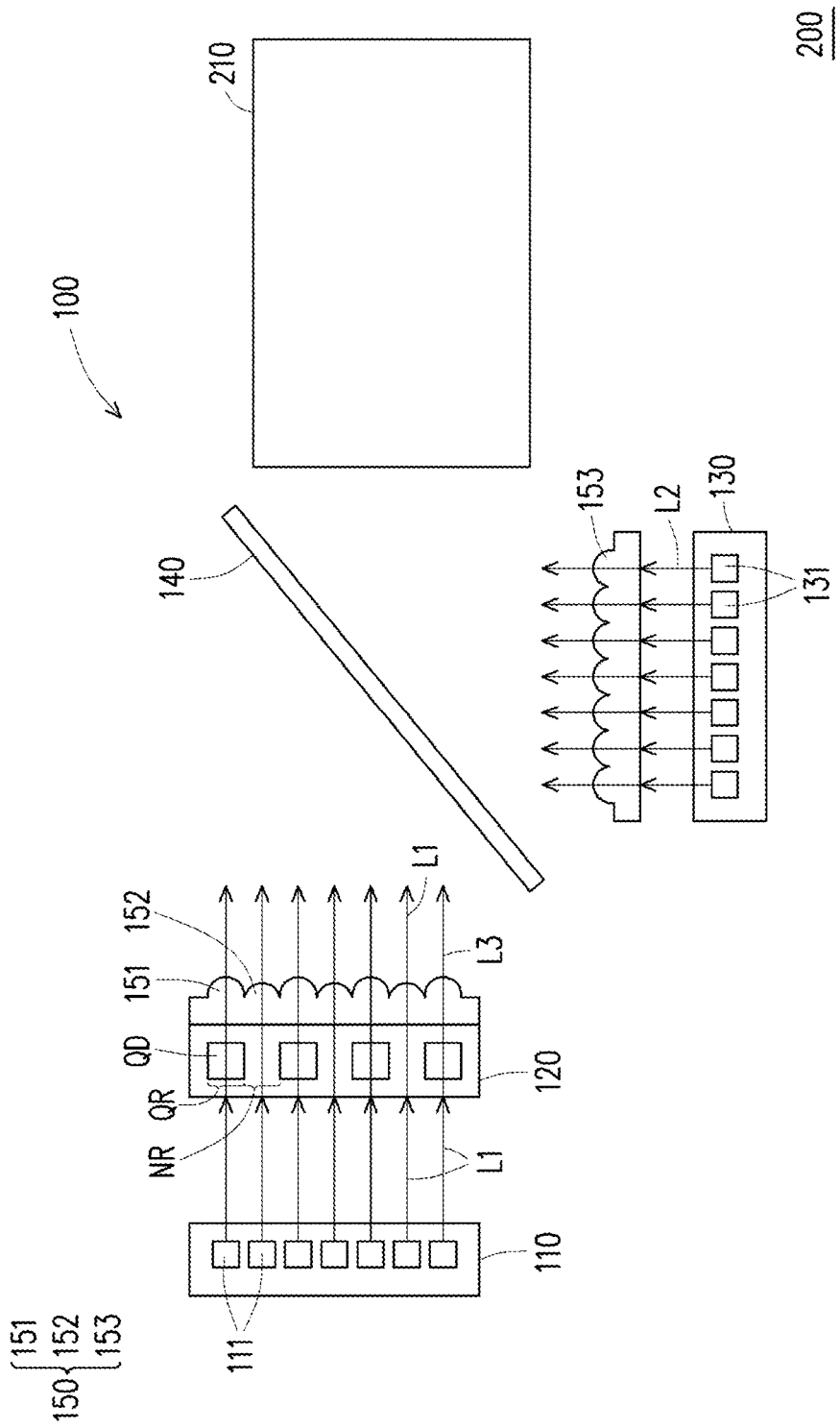
FIG. 1 is a schematic structural diagram of a projection device according to an embodiment of the disclosure.

FIG. 1 is a schematic structural diagram of a projection device according to an embodiment of the disclosure. Please refer to FIG. 1. A projection device 200 includes a display unit 100 and a projection lens 210. The display unit 100 is configured to provide an image beam, and the projection lens 210 is located on a transmission path of the image beam and is configured to project the image beam out of the projection device 200. For example, in this embodiment, the projection lens 210 includes, for example, a combination of one or more optical lenses with various diopter values, such as various combinations of non-planar lenses including, for example, biconcave lenses, biconvex lenses, concave-convex lenses, convex-concave lenses, plane-convex lenses, and plane-concave lenses. In an embodiment, the projection lens 210 may include planar optical lenses to project the image beam from the display unit 100 to a projection target, such as a screen or a wall, in a reflective or transmissive manner. The disclosure does not limit the form and type of the projection lens 210.

In addition, as shown in FIG. 1, in the embodiment, the display unit 100 includes a first display panel 110, a wavelength conversion element 120, a second display panel 130 and a light combining element 140. Specifically, the first display panel 110 has multiple first light emitting elements 111 which may be configured to provide a first color light L1, and the second display panel 130 has multiple second light emitting elements 131 which may be configured to provide a second color light L2. For example, the first display panel 110 and the second display panel 130 are micro-LED display panels, and the first light emitting elements 111 and the second light emitting elements 131 may be blue micro-LEDs and red micro-LEDs, respectively, and may be configured to provide blue light and red light, respectively.

In addition, as shown in FIG. 1, the wavelength conversion element 120 is located on the transmission path of the first color light L1 and is disposed between the light combining element 140 and the first display panel 110. The wavelength conversion element 120 has a conversion region QR and a non-conversion region NR, and the conversion region QR is provided with a quantum dot conversion material QD, which may be configured to convert the first color light L1 into other colors. As shown in FIG. 1, in the embodiment, part of the first color light L1 is converted into a third color light L3 after passing through the conversion region QR, and another part of the first color light L1 that passes through the non-conversion region NR not provided with the quantum dot conversion material QD is still the first color light L1 after passing through the non-conversion region NR. For example, in the embodiment, the quantum dot conversion material QD is a quantum dot conversion material QD that generates green light, and may convert blue light into green light. That is, in the embodiment, the first color light L1 is blue light, and the second color light L2 is red light, and the third color light L3 is green light.

Furthermore, the light combining element 140 is located on the transmission paths of the first color light L1, the second color light L2, and the third color light L3. The light combining element 140 may be a partially transmitting and partially reflecting element, a dichroic mirror, a polarization splitting element, or various other elements that may split beams. For example, in the embodiment, the light combining element 140 may reflect red light and allow blue light and green light to pass through. That is, the light combining element 140 may reflect the second color light L2 and allow the first color light L1 and the third color light L3 to pass through. In this way, the first color light L1 and the third color light L3 from the first display panel 110 may pass through the light combining element 140, and the second color light L2 from the second display panel 130 may be reflected by the light combining element 140, and under the guidance of the light combining element 140, the first color light L1, the second color light L2, and the third color light L3 are mixed to form an image beam.

Moreover, as shown in FIG. 1, in the embodiment, the projection lens 210 is placed on a side opposite to the first display panel 110, so that the image beam may enter the projection lens 210. Since the image beam is formed by the first color light L1, the second color light L2, and the third color light L3 of different colors, for the image beam, the color of the unit pixels of the display unit 100 may be adjusted by controlling the opening and closing of the unit pixels of the first display panel 110 and the second display panel 130, so that the image screen formed by the image beam projected by the projection lens 210 may be a color screen.

In this way, with the disposition of the first display panel 110 and the second display panel 130 of the display unit 100, it is not necessary to dispose an X prism light combining system, and it is possible to dispose only a single-piece beam splitter, which has advantages of a simple structure and small size, and may reduce the possibility of stray light due to introduction of invalid light into the subsequent optical system when the color light of different micro-LED display panels is totally reflected. Moreover, with the disposition of the first display panel 110 and the second display panel 130 of the display unit 100, the projection device 200 has a simple structure, has the advantage of small size, may reduce the number of color lights that need to be aligned, and may also reduce the possibility of stray light in the system. In this way, the contrast and image quality of the image screen may be further enhanced.

Hereinafter, various correspondence relationships between the unit pixels of the display unit 100 and the unit pixels of the first display panel 110 and the second display panel 130 will be further described with reference to FIGS. 2A to 2D.

FIGS. 2A to 2D are diagrams showing various correspondence relationships between the unit pixels of the display unit of FIG. 1 and the unit pixels of the first display panel and the second display panel. In the embodiment, as shown in FIGS. 1 and 2A to 2D, the first display panel 110 has multiple first pixel regions PX1. The first pixel regions PX1 are unit pixels of the first display panel 110. Each first light emitting element 111 is respectively disposed on the first pixel region PX1. The non-conversion region NR corresponds to a first part PR1 of the first pixel regions PX1, and the conversion region QR corresponds to a second part PR2 of the first pixel regions PX1. In addition, the second display panel 130 has multiple second pixel regions PX2. The second pixel regions PX2 are unit pixels of the second display panel 130, and each second light emitting element 131 is disposed corresponding to each second pixel region PX2.

Figure 2A:
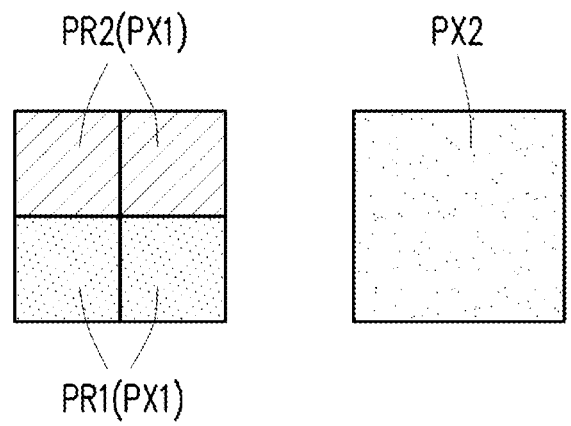
FIGS. 2A to 2D are diagrams showing various correspondence relationships between the unit pixels of the display unit of FIG. 1 and the unit pixels of the first display panel and the second display panel.
Figure 2B:
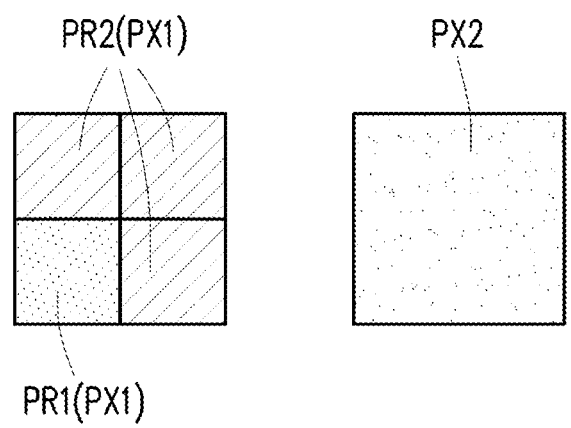
Figure 2C:
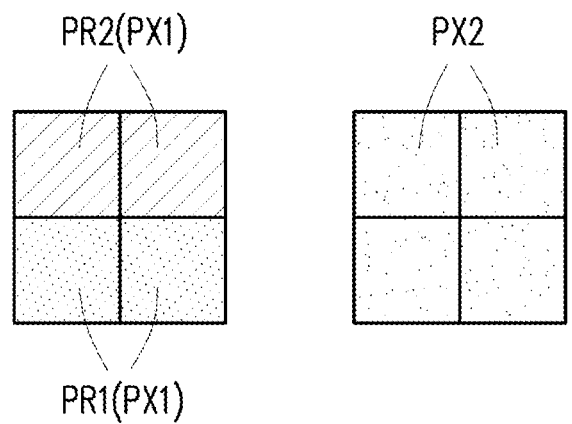
Figure 2D:
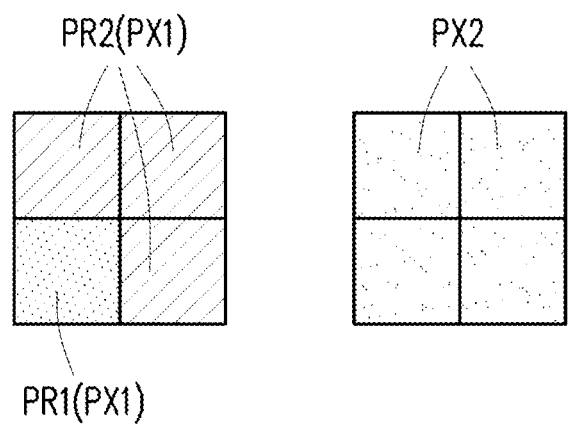

Furthermore, in the embodiment, each second pixel region PX2 and each first pixel region PX1 may have a one-to-many correspondence relationship (as shown in FIGS. 2A and 2B), or each second pixel region PX2 and each first pixel region PX1 may have a one-to-one correspondence relationship (as shown in FIGS. 2C and 2D). For example, as shown in FIGS. 2A and 2B, one second pixel region PX2 of the second display panel 130 corresponds to four first pixel regions PX1 of the first display panel 110; that is, in the embodiment of FIGS. 2A and 2B, the resolution of the first display panel 110 is greater than that of the second display panel 130. In this way, the beam provided by the display pixel region of the display unit 100 as its unit pixel will be formed by the second color light L2 provided by one second pixel region PX2 of the second display panel 130 and the first color light L1 and the third color light L3 provided by four first pixel regions PX1 of the first display panel 110. In this way, each display pixel region of the display unit 100 has a one-to-one correspondence relationship with each second pixel region PX2.

Moreover, in the embodiment, the number of the first part PR1 of the first pixel regions PX1 of the first display panel 110 is less than or equal to the number of the second part PR2 of the first pixel regions PX1 of the first display panel 110. As shown in FIG. 2A, the ratio of the number of the first part PR1 of the first pixel regions PX1 to the number of the second part PR2 of the first pixel regions PX1 is 1:1, or as shown in FIG. 2B, the ratio of the number of the first part PR1 of the first pixel regions PX1 to the number of the second part PR2 of the first pixel regions PX1 is 1:3. In this way, the proportion of the first color light L1 of each display pixel region of the display unit 100 may be less than or equal to the proportion of the third color light L3. In addition, since the second pixel regions PX2 of the second display panel 130 is larger than the first pixel regions PX1 of the first display panel 110, the proportion of the second color light L2 of each display pixel region of the display unit 100 is greater than the proportion of the first color light L1 or the third color light L3. In this way, in the embodiment, the proportion of red light in the white light formed by the display unit 100 is greater than the proportion of blue light or green light, which may enhance the red color performance of the projection screen of the projection device 200, and may meet requirements of models of the projection device 200 with higher color performance requirements for the screen.

In addition, as shown in FIGS. 2C and 2D, each second pixel region PX2 of the second display panel 130 corresponds to each first pixel region PX1 of the first display panel 110, and they have a one-to-one correspondence relationship; that is, in the embodiments of FIGS. 2C and 2D, the resolution of the first display panel 110 is equal to that of the second display panel 130. However, in this way, the beam provided by the display pixel region of the display unit 100 as its unit pixel will be formed by the second color light L2 provided by four second pixel regions PX2 of the second display panel 130 and the first color light L1 and the third color light L3 provided by four first pixel regions PX1 of the first display panel 110. In this way, each first pixel region PX1 and each second pixel region PX2 have the same many-to-one correspondence relationship with each display pixel region. In other words, the resolution of the display unit 100 is greater than the resolution of the first display panel 110 or the second display panel 130.

Moreover, similar to the embodiment of FIGS. 2A and 2B, in the embodiment of FIGS. 2C and 2D, the number of the first part PR1 of the first pixel regions PX1 of the first display panel 110 is also less than or equal to the number of the second part PR2 of the first pixel regions PX1 of the first display panel 110. In this way, the proportion of the second color light L2 of each display pixel region of the display unit 100 is also greater than the proportion of the first color light L1 or the third color light L3. In this way, in the embodiment, the proportion of red light in the white light formed by the display unit 100 is greater than the proportion of blue light or green light, which may enhance the red color performance of the projection screen of the projection device 200, and thus may meet requirements of models of the projection device 200 with higher color performance requirements for the screen.

In addition, please refer to FIGS. 1 and 2A. In the embodiment, the display unit 100 may further include a light concentrating element 150. The light concentrating element 150 is disposed on the transmission paths of the wavelength conversion element 120 and the second color light L2, and the light concentrating element 150 has multiple first concentrating units 151, multiple second concentrating units 152, and multiple third concentrating units 153. For example, the light concentrating element 150 is an array lens; the first concentrating units 151, the second concentrating units 152, and the third concentrating units 153 are respectively different micro lens units, and their optically effective surfaces have different curvatures. Each of the first concentrating units 151 is disposed corresponding to each of the first part PR1 of the first pixel regions PX1, and each of the second concentrating units 152 is disposed corresponding to each of the second part PR2 of the first pixel regions PX1, and each of the third concentrating units 153 is disposed corresponding to each of the second pixel regions PX2. Thus, by the disposition of the first concentrating units 151, the second concentrating units 152 and the third concentrating units 153, the light emitting angles of the first color light L1, the second color light L2 and the third color light L3 may be further reduced, and the light emitting angles of the first color light L1, the second color light L2 and the third color light L3 may be made the same, which may further enhance the optical efficiency of the display unit 100.

In addition, in the embodiment, the first color light L1 is blue light, and the second color light L2 is red light, and the third color light L3 is green light, but the disclosure is not limited thereto. In another embodiment, the first color light L1 may be blue light, and the second color light L2 may be green light, and the third color light L3 may be red light. In other words, the second light emitting elements 131 may be green micro-LEDs, and the quantum dot conversion material QD may be a quantum dot conversion material QD that generates red light. In this way, the color of the unit pixels of the display unit 100 may also be adjusted by controlling the opening and closing of the unit pixels of the first display panel 110 and the second display panel 130, and the image screen projected by the projection lens 210 may also become a color screen. Moreover, in the embodiment, the proportion of green light in the white light formed by the display unit 100 is greater than the proportion of blue light or red light, and the proportion of red light is greater than or equal to the proportion of blue light, which may enhance the brightness of the projection screen of the projection device 200 without sacrificing the red color performance of the projection screen of the projection device 200, and thus may meet requirements of models of the projection device 200 with higher brightness requirements for the screen.

Figure 3:
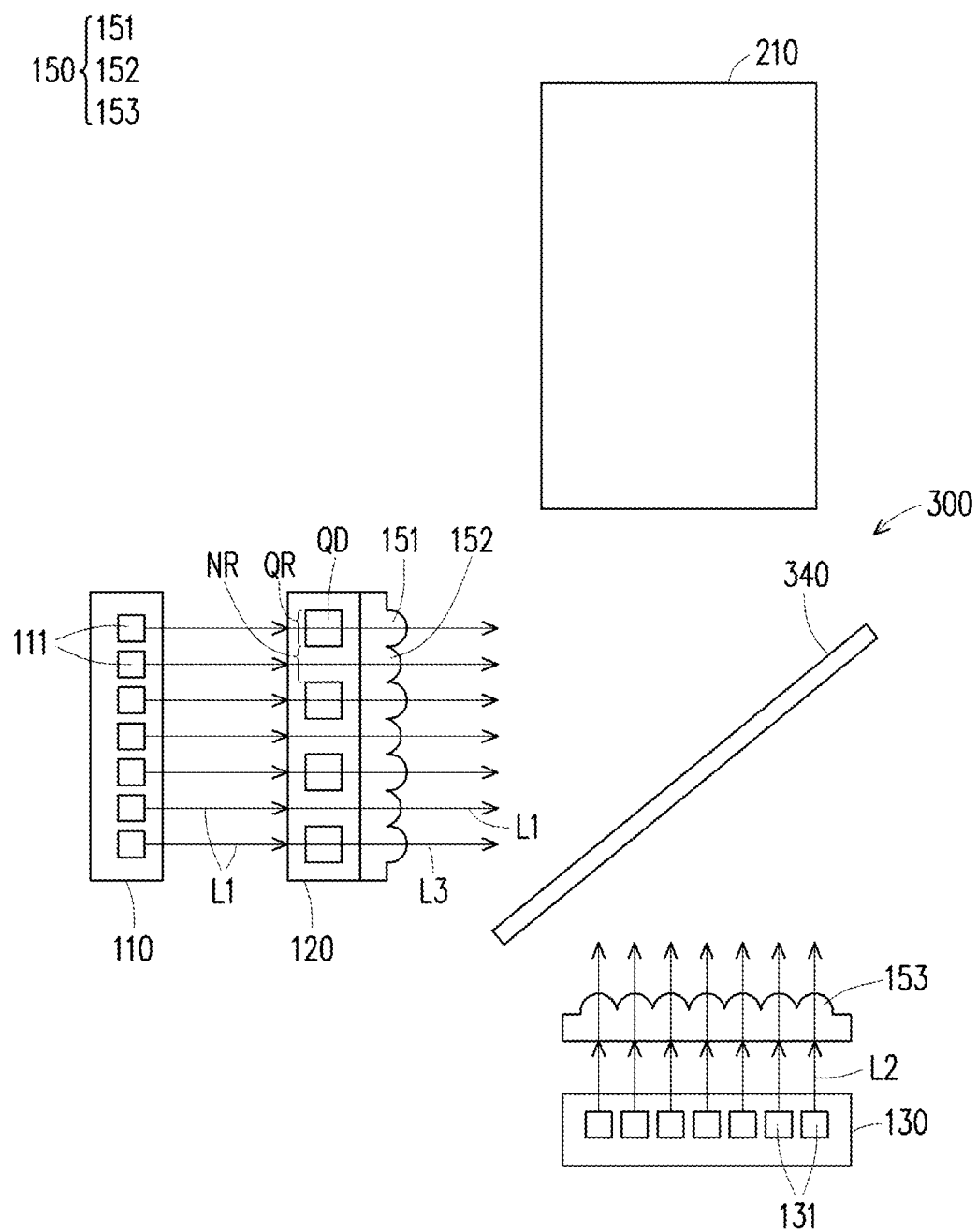
FIG. 3 is a schematic structural diagram of a projection device according to another embodiment of the disclosure.

FIG. 3 is a schematic structural diagram of a projection device according to another embodiment of the disclosure. Please refer to FIG. 3. The display unit 300 of FIG. 3 is similar to the display unit 100 of FIG. 1, and the differences are as follows. Specifically, as shown in FIG. 3, in the embodiment, the light combining element 340 of the display unit 300 may reflect blue light and green light and allow red light to pass through, for example. That is, the light combining element 340 may reflect the first color light L1 and the third color light L3 and allow the second color light L2 to pass through to form an image beam. In addition, the projection lens 210 is placed on a side opposite to the second display panel 130. In this way, the image beam may still enter the projection lens 210 after passing through the light combining element 340. In the embodiment, the display unit 300 has a structure similar to that of the display unit 100, and therefore, the projection device 200 may also achieve similar effects and advantages, which will not be repeated herein.

In summary, the embodiments of the disclosure have at least one of the following advantages or effects. In the embodiments of the disclosure, with the disposition of the first display panel and the second display panel of the display unit, it is not necessary to dispose an X prism light combining system, and it is possible to dispose only a single-piece beam splitter, which has advantages of a simple structure and small size, and may reduce the possibility of stray light due to introduction of invalid light into the subsequent optical system when the color light of different micro-LED display panels is totally reflected. Moreover, with the disposition of the first display panel and the second display panel of the display unit, the projection device has a simple structure, has the advantage of small size, may reduce the number of color lights that need to be aligned, and may also reduce the possibility of stray light in the system. In this way, the contrast and image quality of the image screen may be further enhanced.

However, the above descriptions are only exemplary embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents and are not intended to limit the scope of the disclosure. In addition, the terms "first," "second" and the like mentioned in the specification or the claims are used only to name the elements or to distinguish different embodiments or scopes and are not intended to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display unit comprising:
   a first display panel;
   a wavelength conversion element;
   a second display panel; and
   a light combining element,
   wherein the first display panel has a plurality of first light emitting elements and the plurality of first light emitting elements are configured to provide a first color light,
   the wavelength conversion element is located on a transmission path of the first color light and has a conversion region and a non-conversion region, wherein a quantum dot conversion material is disposed on the conversion region, the conversion region is configured to convert a part of the first color light into a third color light and the third color light is configured to leave the conversion region, the non-conversion region is configured to allow another part of the first color light to pass through,
   the second display panel has a plurality of second light emitting elements and the plurality of second light emitting elements are configured to provide a second color light, and
   the light combining element is located on transmission paths of the first color light, the second color light and the third color light, and is configured to guide the third color light, the second color light and the first color light that passes through the non-conversion region to form an image beam.

2. The display unit according to claim 1, wherein the first display panel has a plurality of first pixel regions, each of the first light emitting elements is disposed corresponding to each of the first pixel regions, the non-conversion region corresponds to a first part of the first pixel regions, the conversion region corresponds to a second part of the first pixel regions, and the number of the first part of the first pixel regions is less than or equal to the number of the second part of the first pixel regions.

3. The display unit according to claim 2, further comprising:
   a light concentrating element, disposed on transmission paths of the wavelength conversion element and the second color light and configured to make light emitting angles of the first color light, the second color light and the third color light be the same, wherein the light concentrating element has a plurality of first concentrating units and a plurality of second concentrating units, each of the first concentrating units is disposed corresponding to each of the first part of the first pixel regions, and each of the second concentrating units is disposed corresponding to each of the second part of the first pixel regions.

4. The display unit according to claim 3, wherein the second display panel has a plurality of second pixel regions, the light concentrating element further comprises a plurality of third concentrating units, each of the third concentrating units is disposed corresponding to each of the second pixel regions, each of the second light emitting elements is disposed corresponding to each of the second pixel regions, and each of the second pixel regions corresponds to multiple first pixel regions, and the display unit has a plurality of display pixel regions, and each of the display pixel regions and each of the second pixel regions have a one-to-one correspondence relationship.

5. The display unit according to claim 2, wherein the second display panel has a plurality of second pixel regions, each of the second light emitting elements is disposed corresponding to each of the second pixel regions, and each of the second pixel regions and each of the first pixel regions have a one-to-one correspondence relationship, and
   the display unit has a plurality of display pixel regions, and each of the display pixel regions corresponds to multiple first pixel regions and multiple second pixel regions.

6. The display unit according to claim 1, wherein the first color light is blue light, the second color light is red light, and the third color light is green light.

7. The display unit according to claim 1, wherein the first color light is blue light, the second color light is green light, and the third color light is red light.

8. A projection device comprising:
   a display unit; and
   a projection lens,
   wherein the display unit is configured to provide an image beam and comprises:
   a first display panel;
   a wavelength conversion element;
   a second display panel; and
   a light combining element,
   wherein the first display panel has a plurality of first light emitting elements and the plurality of first light emitting elements are configured to provide a first color light,
   the wavelength conversion element is located on a transmission path of the first color light and has a conversion region and a non-conversion region, wherein a quantum dot conversion material is disposed on the conversion region, the conversion region is configured to convert a part of the first color light into a third color light and the third color light is configured to leave the conversion region, the non-conversion region is configured to allow another part of the first color light to pass through,
   the second display panel has a plurality of second light emitting elements and the plurality of second light emitting elements are configured to provide a second color light, and
   the light combining element is located on transmission paths of the first color light, the second color light and the third color light, wherein the third color light, the second color light and the first color light that passes through the non-conversion region are guided by the light combining element to form an image beam, and
   the projection lens is located on a transmission path of the image beam and is configured to project the image beam out of the projection device.

9. The projection device according to claim 8, wherein the first display panel has a plurality of first pixel regions, each of the first light emitting elements is disposed corresponding to each of the first pixel regions, the non-conversion region corresponds to a first part of the first pixel regions, the conversion region corresponds to a second part of the first pixel regions, and the number of the first part of the first pixel regions is less than or equal to the number of the second part of the first pixel regions.

10. The projection device according to claim 9, wherein the display unit further comprises:
- a light concentrating element, which is disposed on transmission paths of the wavelength conversion element and the second color light and configured to make light emitting angles of the first color light, the second color light and the third color light be the same, wherein the light concentrating element has a plurality of first concentrating units and a plurality of second concentrating units, each of the first concentrating units is disposed corresponding to each of the first part of the first pixel regions, and each of the second concentrating units is disposed corresponding to each of the second part of the first pixel regions.

11. The projection device according to claim 10, wherein the second display panel has a plurality of second pixel regions, the light concentrating element further comprises a plurality of third concentrating units, each of the third concentrating units is disposed corresponding to each of the second pixel regions, each of the second light emitting elements is disposed corresponding to each of the second pixel regions, and each of the second pixel regions corresponds to multiple first pixel regions, and the display unit has a plurality of display pixel regions, and each of the display pixel regions and each of the second pixel regions have a one-to-one correspondence relationship.

12. The projection device according to claim 9, wherein the second display panel has a plurality of second pixel regions, each of the second light emitting elements is disposed corresponding to each of the second pixel regions, and each of the second pixel regions and each of the first pixel regions have a one-to-one correspondence relationship, and the display unit has a plurality of display pixel regions, and each of the display pixel regions corresponds to multiple first pixel regions and multiple second pixel regions.

13. The projection device according to claim 8, wherein the first color light is blue light, the second color light is red light, and the third color light is green light.

14. The projection device according to claim 8, wherein the first color light is blue light, the second color light is green light, and the third color light is red light.

* * * * *